Figure 1:
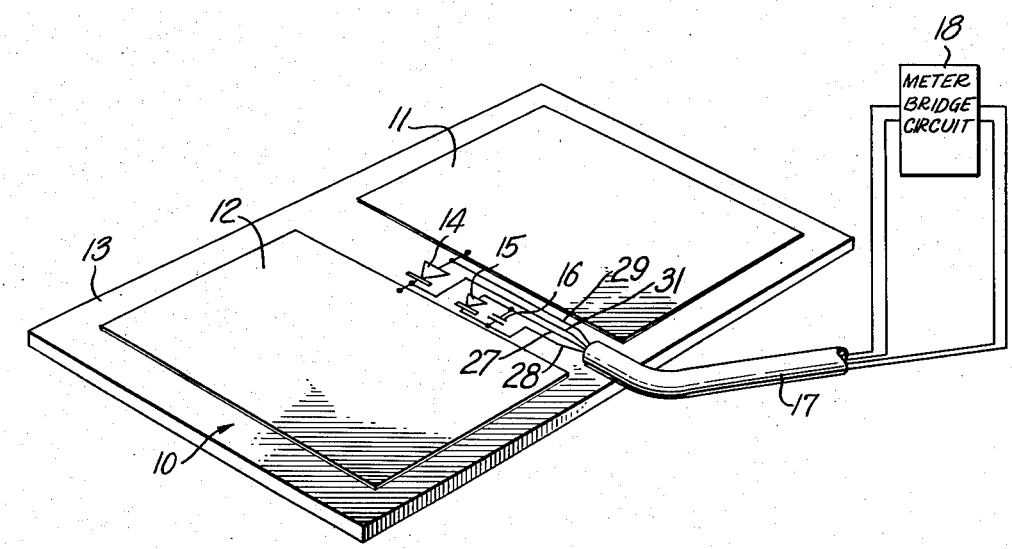

Dec. 6, 1960   O. C. ENIKEIEFF   2,963,576
RADIATION SIGNAL DETECTOR
Filed Oct. 29, 1958

INVENTOR
Oleg C. Enikeieff

BY Mason, Fenwick & Lawrence
ATTORNEYS

United States Patent Office 2,963,576
Patented Dec. 6, 1960

2,963,576

RADIATION SIGNAL DETECTOR

Oleg C. Enikeieff, Silver Spring Md., assignor to Harry C. Miller Company, Rochester, N.Y., a partnership Filed Oct. 29, 1958, Ser. No. 770,389

1 Claim. (Cl. 250—1)

The present invention relates in general to apparatus for the detection of signal radiation sources and more particularly to apparatus for the detection of hidden transmitters or other localized sources of radio frequency interference.

In protecting the security of conference rooms or like security areas against monitoring of conversations or sounds generated in the area by means of hidden radio frequency transmitters or like devices, it is desirable to have means which may be conveniently used to examine the conference area and detect the presence of any radio frequency generating source in or approximate to that area. It is particularly desirable that such a radiation detector be arranged in the form of a readily portable unit in order that it may be conveniently transported by security personnel or persons with the duty of "debugging" such a security area.

An object of the present invention, therefore, is the provision of a novel radiation detector which is readily transportable and highly reliable in operation.

Another object of the present invention is the provision of a novel radiation detector for detecting radiant energy sources in localized areas by responding to the electrostatic component of induction electric fields, as distinguished from magnetic fields, and thereby render the detector substantially free of interference from sources of radiation which are remote from the localized area.

Another object of the present invention is the provision of a novel radiation source detector for indicating the presence of localized sources of radio frequency radiation such as hidden radio transmitters and the like, which is extremely sensitive to the electrostatic component of the induction electric field of a radio transmitter.

Other objects, advantages and capabilities of the present invention will become apparent from the following detailed description taken in conjunction with the accompanying drawing illustrating one preferred embodiment of the invention.

Figure 2:
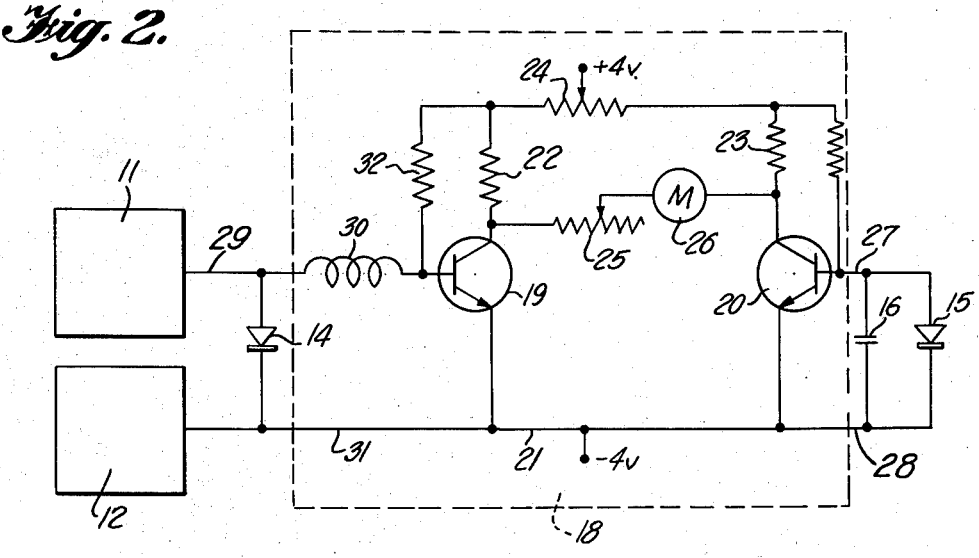

In the drawing:

Figure 1 is a perspective view of a radio frequency signal pick up unit and a block diagram of a metering component forming a radiation energy detector embodying the present invention, with some of the electrical components of the detector which are associated with the pick up unit being shown in schematic form; and Figure 2 is a schematic diagram of a radiation energy detector embodying the present invention.

Referring to the drawing wherein like reference characters designate corresponding parts throughout the several figures, the radiation detector of the present invention comprises a signal pick up unit, generally indicated by the reference character 10, serving as an antenna for capacitively coupling the detector to a source of radiation. The pick up unit 10 may be physically arranged for convenient handling by the operator by providing a pair of laterally spaced metallic plates 11, 12 in coplanar relation on rigid mounting panel or platform 13. For example, the plates 11, 12 which form in effect, two condenser plates, may be etched on a piece of copper clad Teflon or other suitable material of the type used, for example, in producing printed circuits. The condenser plates 11, 12 are spaced in side-by-side coplanar relation, as indicated in Figure 1, and may, for example, be square plates of approximately 4 inches by 4 inches or 6 inches by 6 inches separated by approximately 1 inch. A pair of diodes 14, 15 are mounted in suitable supports on the handle 13 between the plates 11, 12. The diode 14 is connected between the plates 11, 12 in the manner illustrated in Figures 1 and 2, and the diode 15 is a dummy diode adapted to provide a carefully matched pair, which will minimize variations in the operation of a meter circuit, to be hereinafter described, such as may result from temperature variations at the pick up unit, or the like. A large capacitor 16 is also coupled across the diode 15 to prevent response of the dummy diode 15 to radio frequency fields.

Leads from the components 14, 15 and 16 are lead off from the panel 13 through or along a handle 17 and are coupled to a meter circuit 18, shown in block form in Figure 1 and in schematic form in Figure 2.

The meter circuit 18 is preferably a transistorized D.-C. microammeter of the bridge type, employing a pair of transistors 19, 20 arranged in a balanced circuit. The transistors 19, 20 may be, for example, 2N35 NPN type transistors having their emitters connected together through the lead 21 to a negative potential of, for example, minus four volts. Their collectors are connected together through collector load resistors 22 and 23 and a balance control potentiometer 24 to a collector voltage source of about four volts, and are also connected together through a metering leg including potentiometer 25 and meter 26, which may be a 0–50 microammeter. The parallel network comprising the dummy diode 15 and capacitor 16 are connected between the base and the emitter of the transistor 20 through leads 27 and 28, respectively. The plate 11 of the pick up unit is connected through lead 29 and a radio frequency choke 30 to the base of the transistor 19, and the plate 12 is connected through lead 31 to the negative lead 21 and the emitter of the transistor 19. The active diode 14 is intercoupled across the leads 29, 31 and therefore across the plates 11, 12 in the manner shown, with the cathode terminal of the diode 14 being connected to the lead 31 and the anode terminal of the diode 14 being connected to the lead 29. A resistor 32 is connected between the base of the transistor 19 and the upper end of the collector load resistor 22 to control the bias current through the base of transistor 19. It will be noted that the active diode 14 is biased in the forward direction so that it is normally conducting and acting, therefore, changes its impedance upon microampere variations to provide greatly increased sensitivity.

When a radio frequency source of radiation is capacitively coupled with the plates 11, 12 a radio frequency potential is produced between the plates 11, 12. This produces a change in the conductance of the diode 14 and also rectification occurs across the diode. The radio frequency energy picked up by the plates 11, 12 is detected and produces an unbalance in the meter circuit which will be indicated by deflection of the meter 26. Because the metering circuit employs no tuned circuits, it has broad band characteristics and will be responsive to radio frequency energy of an extremely wide range.

The meter circuit herein described is very similar to that disclosed on pages 157–158 of Transistor Circuit Engineering edited by Richard F. Shea and published by John Wiley and Sons, Inc.

An important feature of this detector is that it responds to radio frequency radiation sources by capacitive coupling therewith, so that it is sensitive primarily to the electrostatic component of the induction electric field of the transmitter and is relatively insensitive to electromagnetic radiation produced by distant sources.

If it is desired to use a system similar to that described above to set off an alarm automatically when a transmitter located in the room in which it is installed is turned on, an external antenna may be coupled to the two condenser plates 11, 12 by means of external connectors, and the microammeter 26 may be replaced with a similar unit incorporating a relay which controls an audible or visible alarm.

While but one specific embodiment of the invention has been described, it will be understood that various modifications may be made therein within the spirit and scope of the invention and it is desired, therefore, that only such limitations be placed on the invention as are imposed by the prior art and are set forth in the appended claim.

I claim:

Apparatus for detecting radio frequency signal sources and the like which is sensitive primarily to the electric field of the signal source comprising a pair of plates adapted to be capacitively coupled to a radio frequency source to produce a radio frequency potential across said pair of plates responsive to the signal, a diode directly coupled between said plates for detecting and rectifying the radio frequency signal coupled to said plates, a direct current bridge circuit having a pair of normally balanced legs and a meter for indicating a state of unbalance between said legs, means for applying the detected signal from said diode to one of said legs to vary conductance therein and unbalance the bridge to produce deflection of said meter in response to a signal coupled to said plates, said plates comprising a pair of laterally spaced and aligned metallic plates disposed in a single plane on a portable mounting platform, said diode being coupled between said plates and supported on said platform, and said bridge circuit including a dummy diode coupled with the other leg of said bridge circuit but unconnected with said plates, said dummy diode being supported on said platform adjacent said first mentioned diode.

References Cited in the file of this patent

UNITED STATES PATENTS

| | | |
|---|---|---|
| 852,405 | Wolcott | Apr. 30, 1907 |
| 2,627,543 | Obermaier | Feb. 3, 1953 |
| 2,879,382 | Freen | Mar. 24, 1959 |

OTHER REFERENCES

Turner: "Transistorized TV Antenna Compass and Field Strength Meter," Radio and Television News, January 1956, pp. 43, 44, 45.